United States Patent
Dixon et al.

(10) Patent No.: US 9,984,068 B2
(45) Date of Patent: May 29, 2018

(54) SYSTEMS AND METHODS FOR MULTILINGUAL DOCUMENT FILTERING

(71) Applicant: McAfee, Inc., Santa Clara, CA (US)

(72) Inventors: Edward Dixon, Cork (IE); Marcin Dziduch, Cork (IE); Craig Olinsky, Paderborn (DE)

(73) Assignee: McAfee, LLC, Santa Clara, CA (US)

( * ) Notice: Subject to any disclaimer, the term of this patent is extended or adjusted under 35 U.S.C. 154(b) by 33 days.

(21) Appl. No.: 14/858,413

(22) Filed: Sep. 18, 2015

(65) Prior Publication Data

US 2017/0083508 A1    Mar. 23, 2017

(51) Int. Cl.
G06F 17/20    (2006.01)
G06F 17/21    (2006.01)
G06F 17/27    (2006.01)
G06F 17/28    (2006.01)
G06F 17/30    (2006.01)

(52) U.S. Cl.
CPC ........ *G06F 17/2785* (2013.01); *G06F 17/275* (2013.01); *G06F 17/289* (2013.01); *G06F 17/3069* (2013.01); *G06F 17/30669* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 2001/0041328 A1* | 11/2001 | Fisher | G09B 5/065 434/157 |
| 2003/0009495 A1 | 1/2003 | Adjaoute | |
| 2005/0143971 A1* | 6/2005 | Burstein | G06F 17/274 704/4 |
| 2006/0129383 A1* | 6/2006 | Oberlander | G06F 17/274 704/10 |
| 2007/0061335 A1* | 3/2007 | Ramer | G06F 17/3064 |
| 2007/0106491 A1 | 5/2007 | Carter et al. | |
| 2007/0136256 A1 | 7/2007 | Kapur et al. | |

(Continued)

FOREIGN PATENT DOCUMENTS

WO    2014014732 A1    1/2014

OTHER PUBLICATIONS

International Search Report and Written Opinion for PCT Application No. PCT/US2016/043827 completed Oct. 31, 2016, 11 pages.

*Primary Examiner* — Richemond Dorvil
*Assistant Examiner* — Thuykhanh Le
(74) *Attorney, Agent, or Firm* — Hanley, Flight and Zimmerman, LLC

(57) ABSTRACT

Systems, apparatus, computer-readable media, and methods to provide filtering and/or search based at least in part on semantic representations of words in a document subject to the filtering and/or search are disclosed. Furthermore key words for conducting the filtering and/or search, such as taboo words and/or search terms, may be semantically compared to the semantic representation of the words in the document. A common semantic vector space, such as a base language semantic vector space, may be used to compare the key word semantic vectors and the semantic vectors of the words of the document, regardless of the native language in which the document is written or the language in which the key words are provided.

15 Claims, 7 Drawing Sheets

(56) References Cited

U.S. PATENT DOCUMENTS

| | | | |
|---|---|---|---|
| 2007/0174255 A1 | 7/2007 | Sravanapudi et al. | |
| 2008/0221892 A1* | 9/2008 | Nathan | G06F 17/279 704/257 |
| 2009/0288150 A1* | 11/2009 | Toomim | G06F 21/6218 726/5 |
| 2010/0153369 A1* | 6/2010 | Peoples | G06F 17/30657 707/722 |
| 2010/0229120 A1* | 9/2010 | Inoue | G06F 3/0482 715/811 |
| 2011/0213777 A1* | 9/2011 | Sun | G06F 17/30707 707/740 |
| 2012/0192227 A1* | 7/2012 | Fleischman | H04N 21/2407 725/34 |
| 2012/0254333 A1* | 10/2012 | Chandramouli | G06F 17/27 709/206 |
| 2013/0159320 A1* | 6/2013 | Gao | G06F 17/30867 707/748 |
| 2014/0149106 A1* | 5/2014 | Beretta | G06F 17/273 704/9 |
| 2015/0242493 A1* | 8/2015 | Misra | G06F 17/30646 707/727 |
| 2015/0278200 A1* | 10/2015 | He | G06F 17/2785 704/2 |
| 2015/0324469 A1* | 11/2015 | Keyngnaert | G06F 17/30867 707/706 |
| 2015/0331929 A1* | 11/2015 | El-Saban | G06F 17/30598 707/739 |
| 2015/0347393 A1* | 12/2015 | Futrell | G06F 17/2785 704/9 |
| 2016/0063442 A1* | 3/2016 | Bennett | G06Q 10/1053 705/319 |
| 2016/0092837 A1* | 3/2016 | Panigrahi | G06Q 10/1053 705/319 |
| 2016/0170982 A1* | 6/2016 | Djuric | G06N 3/0454 707/740 |
| 2016/0196342 A1* | 7/2016 | Kim | G06F 17/30728 707/728 |
| 2016/0321541 A1* | 11/2016 | Liu | G06N 3/0454 |
| 2016/0350283 A1* | 12/2016 | Carus | G06F 17/2785 |

\* cited by examiner

SYSTEMS AND METHODS FOR MULTILINGUAL DOCUMENT FILTERING

TECHNICAL FIELD

This disclosure generally relates to systems and methods for language translation, and more particularly to multi-path language translation.

BACKGROUND

Filtering of documents have been increasingly important in the Internet age for purposes such as Internet searching and/or malicious email or document blocking. The mechanism of searching may involve syntactic searching, where words in a document may be syntactically compared to a set of key words (e.g., taboo words or search terms). When handling multilingual documents, search syntax from various different languages may be used for the purposes of filtering. This type of syntactic search across multiple languages may be a costly, slow, and/or resource intensive activity.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE DISCLOSURE

Figure 1:
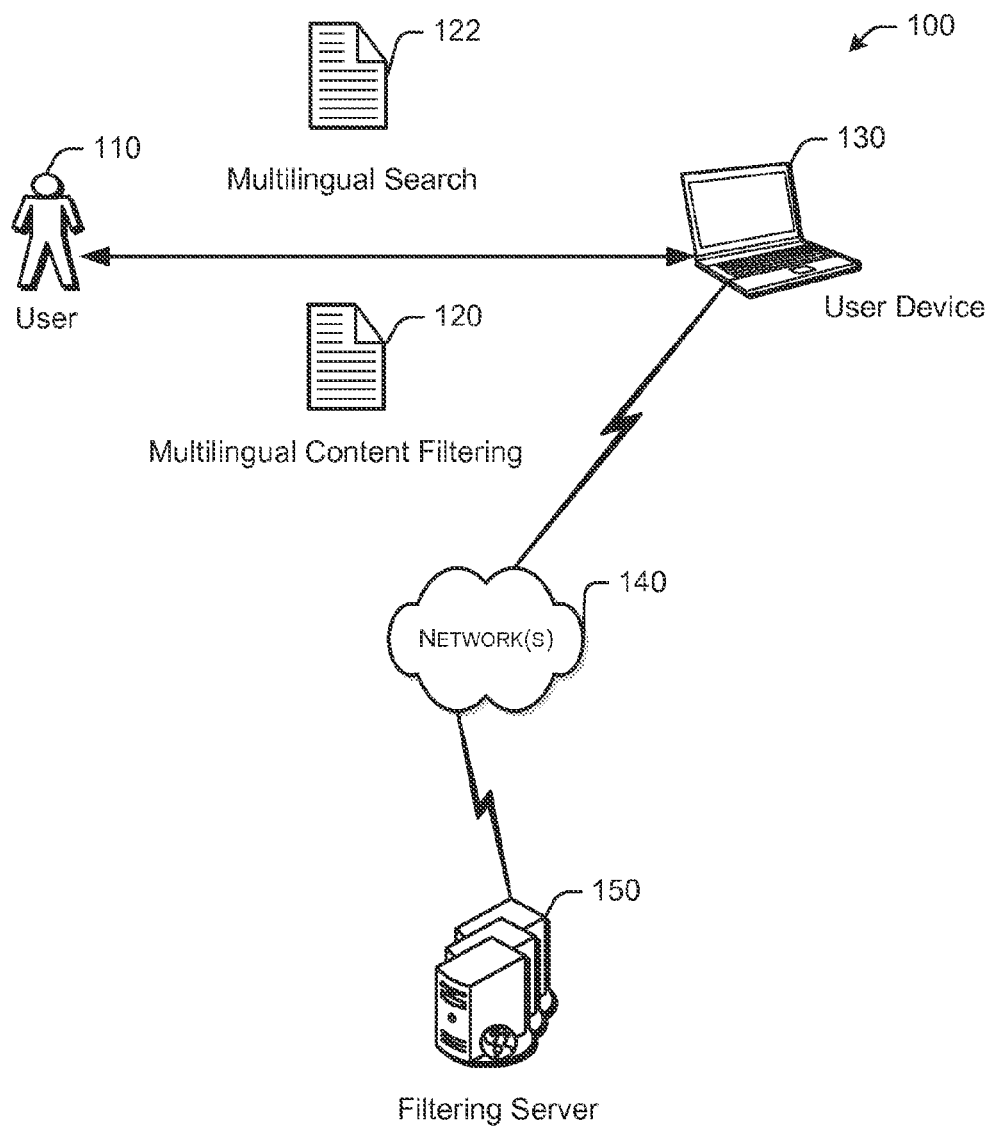
FIG. 1 depicts a simplified schematic diagram of an example environment with a filtering server that provides filtering and/or search services, in accordance with example embodiments of the disclosure.

Embodiments of the disclosure are described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will be thorough and complete, and will fully convey the scope of the disclosure to those skilled in the art. Like numbers refer to like, but not necessarily the same or identical, elements throughout.

Embodiments of the disclosure may provide systems, apparatus, computer-readable media, and methods for searching and/or filtering words in a multilingual fashion. In example embodiments, semantic mechanisms may be used for the purpose of search or filtering of documents. These mechanisms may involve semantic vector representations of words for the purposes of searching or filtering semantic representations of words in a document (e.g., website, text document, audio document, electronic mail (email), etc.). Key words, taboo words, or search terms, referred to hereinafter collectively as key words, may be used as items on the basis of which a search or filtering is performed. For example, for the purposes filtering, a list of taboo words, such as words related to gambling, pornography (e.g., porn), violent material, sexual material, adult content, combinations thereof, of the like, may be provided. For example, words related to gambling may include "gamble," "casino," "poker," black jack," "roulette," or similar words. These taboo words may be used as criteria of the filtering. In example embodiments, the semantic vectors for the taboo words may be determined. This may be determined using a lookup table, a service, such as Word2Vec, perform mathematical operations to determine a semantic vector representation of the taboo word, or the like.

In example embodiments, after semantic vector(s) corresponding to each of the taboo word(s) are determined, the taboo word semantic vectors may be compared to semantic vectors of words in a document to identify if a document is to be filtered. The words of the document may be in a different language than the words than the taboo words specified. In this case, the taboo words may be in a base language and the taboo word semantic vectors, used for the purposes of filtering, may be in a base language semantic vector space. The words of the document may be in a native language, such as one that is the same or different to the base language. If the words of the document is in a native language different from the base language, then the semantic vectors of the words of the document may be determined in the native language semantic vector space. In other words, the native language semantic vectors of the words of the document may be determined first by any suitable mechanism. After determining the native language semantic vectors of the words of the document, the native language semantic vectors of the words may be transformed to corresponding base language semantic vectors. This transformation may be performed by multiplying the native language semantic vectors by a native language-to-base language translation matrix. In some example embodiments, the base language semantic vectors for all of the words of the document to be filtered may be determined. In other example embodiments, base language semantic vectors for only a subset of the words of the document may be determined. For example, in some cases, semantic vectors for common words, such as "a," "the," "or," "and," or the like, may not be determined.

It will be appreciated that some example documents that are applied to the systems, methods, apparatus, and computer readable media, as disclosed herein, may be multilingual (e.g., documents may be written in two or more languages). With multilingual documents, in some cases, some of words of the document may be in the base language that is used during the filtering process and other words may be in one or more native languages other than the base language. In these cases, the base language semantic vectors of the words in the base language of the document may be determined by a direct pathway and the base language semantic vectors of the words that are not in the base language may be determined in a multi-path fashion, where the native language semantic vectors are first determined for those words and then those native language semantic vectors are transformed to the corresponding base language semantic vectors. In other cases, all of the words of the document may be in native languages other than the base language. In these cases, for all of the words for which base language semantic vector representations are to be determined, a multi-path determination may be employed where the native language semantic vectors for each of the words may be determined and then those native language semantic vectors may be used to determine the corresponding base language semantic vectors.

After the base language sematic vectors of the words of the document have been determined, in accordance with example embodiments of the disclosure, distances from each of the base language semantic vectors of the words to each of the base language semantic vectors of the taboo words may be determined. The distances may be determined, in a hyper-dimensional sense, using any variety of suitable calculations, such as cosine distance, sine distance, cosine similarity, Euclidean distance, straight dimensional differences, combinations thereof, or the like. The distance(s) corresponding to each word, once determined, may be organized in any suitable manner, such as, for example, tabulated as a relation table. The distance data may be stored in a datastore in example embodiments. The distance data, as determined for each of the words may be applied to a filtering model to make a determination of whether the document is to be filtered. The filtering model may be any suitable model, such as, for example, a regression model, a decision tree, or the like. The filtering model may be one that is based at least in part on training data, where a set of distance data may be determined for documents for which the filtering status is known (e.g., whether the document is to be filtered).

As a non-limiting example of the mechanism of filtering described above, suppose an email written in French is received at an email server and a determination of filtering is to be performed for the email to determine if the email is to be delivered to the recipient of the email or flagged as spam. Consider further that the base language is English and that the taboo words for the purpose of filtering are specified in English. In this case, the English semantic vectors for the taboo words may be determined. Furthermore, the French semantic vectors of the words of the email may be determined. The French semantic vectors for the words of the email may then be translated to English semantic vectors by multiplying the French semantic vectors by a French-to-English translation matrix. In this case, to minimize processing bandwidth, only words that are longer than three letters in the document, may be used for determining the base language semantic vectors of the document. After identifying the English semantic vectors of the words of the email, the distances between each of English semantic vectors of the words of the email and each of the taboo word English semantic vectors may be determined using both cosine distance and Euclidean distance. The distance data may be tabulated as a data array structure and provided to a filtering model. The filtering model may use the tabulated distance data (e.g., both the cosine distance data and the Euclidean distance data corresponding to each word of the email and each taboo word) to determine that the email is to be filtered. Upon identifying that the email is to be filtered, the email may be blocked from delivery to the recipient, and instead, may be deleted, flagged as spam, stored in a filtered email folder, and/or otherwise blocked.

In example embodiments, the systems, methods, computer readable media, and/or apparatus, as described herein, may be applied to multi-lingual and/or semantic search. Similar to the mechanism for filtering, a set of key words (e.g., search terms) may be determined. These search terms may be entered by an individual for whom the search is performed, such as via an Internet search engine website. The base language semantic vectors for the search terms in a base language semantic vector space may be determined for each of the entered search terms. In some cases, the search terms may be entered in the base language. In other cases, the search terms may be entered in a language other than the base language. In the case where the search terms are entered in a language other than the base language, finding the base language semantic vectors may involve finding a native language semantic vector of the search terms and then converting those native language semantic vectors to corresponding base language semantic vectors of the search terms.

Documents from among which a search is conducted may be processed by finding base language semantic vectors for the words of each of those documents (e.g., Internet websites, intranet websites, text documents, word processing documents, audio document, etc.) for which the search is performed. Again, depending on the native language of the documents on which the search is performed, the determination of the base language semantic vectors of the words of the documents may involve more than one process. If a particular document happens to be in the base language, then the base language semantic vectors for that document may be determined directly for that document. In other cases, where the native language of the document is not the same as the base language, native language semantic vectors may be determined for the words of that document and then the native language semantic vectors may be translated to corresponding base language semantic vectors, such as by multiplying the native language semantic vectors by a native language to base language translation matrix. It will be appreciated that in these cases, the quality of the base language semantic vector representations of the words of the document may be limited, at least in part, by the quality of the native language to base language translation matrix.

The base language semantic vectors of the words of the document that are to be assessed for relevance as part of the search may be compared to the base language semantic vectors for the search terms. The distances between the base language semantic vectors of the words may be determined relative to the base language semantic vectors of the search terms. This distance data may be tabulated for each of the documents from which relevant search results may be selected. The set of distance metrics for each of the documents, where the distance metrics are based at least in part on the search terms and the base semantic vector representations thereof, may be applied to filtering model(s) and/or search model(s). The filtering model(s) may indicate, based at least in part on the distance metrics of a particular document, whether that particular document is relevant and whether the document should be indicated as a search hit, or otherwise a document to present to the searcher based at least in part on the search term(s) associated with the search. The filtering model(s) for search, as in the embodiments for document filtering based at least in part on taboo words, may be constructed based on documents that are deemed to be hits. In other words, the filtering model(s) for search may be based at least in part on any suitable learning model. The filtering model(s) may use aspects of artificial learning and may apply any suitable learning mechanism including, but not limited to, supervised learning, unsupervised learning, reinforcement learning, transduction, any combination thereof, or the like. The filtering model(s) may be in any suitable form, such as regression models, Bayesian inference model(s), any variety of decision trees, any suitable type of conditional statistical models, any suitable type of machine-learning model, combinations thereof, or the like.

In some example embodiments, when searching from a variety of documents, instead of or in addition to identifying a search hit (e.g., a suitably high level of relevance to the search terms to select and/or present the corresponding document as a search result), the search hits may also be ranked in terms of relevance. This may be performed by using the distance metrics, as determined for each of the documents, and applying the distance metrics to the filtering model(s) to identify a numerical relevance score associated with the documents that are search hits. In example embodiments, this numerical relevance score may be used to order the documents and/or rank the documents that are presented as search hits. In some example embodiments, instead of determining search hits, the documents from among which the search is conducted according to the entered search terms may be ordered from most relevant to least relevant or vice versa. The relevance score associated with each of the documents may provide an indication of the relevance of the corresponding document by providing some measure the distance between the base language semantic vectors of the words of the document and the base language semantic vectors of the search terms of the search performed.

As a non-limiting example, the relevance score may be calculated as the sum of the distances of a first predetermined number of words with a minimum distance to one of the search terms in the base language semantic vector space. As an alternate non-limiting example, the relevance score may be determined by summing a predetermined number of the distances for the words of the document from each of the search terms. For example, if the search has two search terms, the distances for the nearest 50 words to the first search term may be summed and then summed again with the minimum distances for the nearest 40 words to the second search terms. In another non-limiting example, the product of the distances of each of the words of a document to each of the search terms may be calculated and then divided by the combined sum of the distances for each of the words to all of the search terms. It will be appreciated that each of the aforementioned example mechanisms for determining a relevance score associated with each of the documents in the universe of documents to search may be examples only, and there may be any number of suitable alternate mechanisms for determining a relevance score that provides an indication of the relative relevance of the documents from which the search is conducted.

Representing words in a semantic vector space may make use of semantic properties, meanings, and/or definition of the words to represent the words in a vector space (e.g., hyper-dimensional vector space). Similarities in the meaning of two words may be embodied in the relative proximity of the two words in semantic vector space. For example, the words "chicken" and "turkey" may be relatively proximal in semantic vector space, while the words "chicken" and "combustion" may be relatively distal in semantic vector space. The concepts of semantic vector representation of words is described elsewhere, such as, for example, in Mikolov, Tomas, et al. "Efficient Estimation of Word Representations in Vector Space," Cornell University Library, submitted Jan. 16, 2013, World Wide Web link: http://arxiv.org/abs/1301.3781.

The vector representation of words in a semantic vector space in a first language may be used to find translations of words from the first language to a second language using a translation matrix between the first language and the second language. This translation matrix may, in example embodiments, provide a linear or affine transform from the semantic vector space of the first language to semantic vector space of the second language. For example, if one takes the semantic vector representation of the French word "pomme" (French for apple) in French semantic vector space, and multiplies that semantic vector by the French-to-English translation matrix, then the resulting semantic vector in the English semantic vector space, assuming minimal errors in the French-to-English matrix, may be relatively close to the English vector representation of the word "apple."

Semantic vector representations of a corpus of words of a first language may be generated in the semantic vector space of that first language. Similarly, semantic vector representations of a corpus of words in a second language may be generated in the semantic vector space of the second language. As a non-limiting example, the semantic vector space of the first language and the second language may each have 300 dimensions (e.g., 300 independent orthogonal unit vectors). Thus, in this example, a semantic vector representation of a word in either of the two languages may comprise a scalar value corresponding to each of the 300 independent orthogonal unit vectors (e.g., the semantic vector of the word may be represented as a 300×1 matrix). The semantic representations of each of the dimensions of the first language semantic vector space may be different from the semantic representations of each of the dimensions of the second language vector space. In other words, a particular word in the first language and its translation in the second language may have different vector representations in each of their respective semantic vector space. As a non-limiting example, the semantic vector of the word "elephant" in the English semantic vector space may be quite different than the semantic vector of the word "elefante" (Italian for elephant) in the Italian semantic vector space, even though both words in both linguistic vector spaces may be represented by 300 dimensions. It will be appreciated that the dimensionality of 300 of the semantic vector spaces of various languages were selected only by way of example. Indeed the semantic vector spaces of the various languages may have any suitable number of dimensions, such as 100, 150, 263, 600, 1000, or the like.

After semantic vectors of a corpus of words have been determined in both the first language and the second language, a set of seed words (e.g., 1000 words) may be mapped between the first and the second languages to determine a translation matrix between the first and the second languages. In example embodiments, these seed words may be known translations (e.g., word mappings) between the first language and the second language. The translation matrix between the first language and the second language semantic vector spaces may be such that multiplying a semantic vector representation of a word in the first language by the translation matrix between the first and second languages may result in a semantic vector in the second language semantic vector space that is close to the semantic vector of the translation of the word. For example, if the semantic vector of "elephant" in the English semantic vector space is multiplied by the English-Italian translation matrix, then the resulting semantic vector may be relatively close to the semantic vector for the word "elefante" in the Italian semantic vector space, assuming that errors in the English-Italian translation matrix are relatively small. In example embodiments, the translation matrix between two languages may have a dimensionality based on the dimensionality of the semantic vector space of the two languages. For example, if both the first language and the second language semantic vector space has a dimensionality of 300 dimensions, then the translation matrix between the first and second language semantic vector space may have dimensions of 300×300.

It will be appreciated that the translation matrix between two languages may be calculated using seed words that may be a subset, and in some cases, a relatively small fraction, of the corpus of words for which semantic vector representations may exist in each of the two languages. As a result, in example embodiments, errors may exist in the translation matrix between the two languages. These errors, in example embodiments, may manifest themselves as islands of relatively greater errors in spaces that are relatively distal from the seed words used to generate the translation matrix between the two languages.

It should be noted that despite errors that may arise from the translation of a semantic vector of a word in a first language (e.g., native language) to a corresponding semantic vector of the word in a second language (e.g., base language), there is likely to be relative semantic similarity in the between the semantic vector of the first language and the semantic vector in the second language. Therefore, the systems, methods, computer-readable media, and apparatus, as described herein, may enable semantic level filtering and/or search, regardless of the language(s) in which key words (e.g., search terms, taboo words, etc.) are specified or the language in which a document is written or spoken. In example embodiments, the semantic filtering and/or search, as described herein, may provide for simpler specifications of taboo words and/or search terms, compared to a no-semantic filtering and/or search, such as a syntactic search. In other words, according to example embodiments, separate filtering models may not need to be established for every different language when filtering documents that may be in any language. Indeed, in example embodiments, the taboo words used for filtering may be specified in a single language without having to provide translations thereof in every language in which documents may be received. Furthermore, the filtering and/or searching may provide a semantic quality without having to specify every syntactic synonym of key words, either in the same language or across languages.

FIG. 1 depicts a simplified schematic diagram of an example environment 100 with a filtering server 150 that provides filtering and/or search services, in accordance with example embodiments of the disclosure. The environment may include a user 110 that receives one or more multilingual content 120 and/or desires one or more documents 122 (e.g., written, electronic, audio, etc.) from a multilingual search. The environment 100 may further include a user device 130 that may be configured to interact with the user 110 to initiate a multilingual search and/or receive content that may be filtered.

The multilingual search document 122 may be any variety of Internet webpages or other Internet content, intranet webpages or other intranet content, files or documents residing at a remote server, files or documents residing at the user device 130, database query of a local or remote database, combinations thereof, or the like. In example embodiments, the user device 130 may be configured to execute instructions to present a web page or any other suitable search interface to solicit one or more search terms, such as from the user 110. In some example embodiments, the user device 130 may further be configured to perform the search using the search terms, in accordance with the disclosure. In other example embodiments, the user device 130 may be configured to provide the search terms to one or more other entities, such as the filtering server 150, such that the one or more other entities may perform the search in accordance with the disclosure. The user device 130 may still further be configured to receive search results and present the same to the user 110.

The multilingual content 120 to be filtered may be any suitable content and/or data file with which the user 110 may interact, such as via the user device 130. The interaction may be via the user device 130 in a thin-client setup, where the content 120 may reside somewhere other than the user device, such as at an email server or at the filtering server 150, and is presented to the user 110 from the remote server, via the user device 130. In other cases, the content may reside at the user device 130 itself. Examples of content that may be filtered may include, for example, email, text messages, voicemail, text documents, audio documents, video documents, applications, computer code, combinations thereof, or the like. In some cases, the filtering may be part of a corporate, educational entity, and/or non-profit entity's policy to block certain types of content, such as, for example, pornography, adult content, profanity, gambling, online shopping, online gaming, illegal content, violent content, sexual content, combinations thereof, or the like. In other cases, the filtering may be part of services that the user 110 requests, such as harmful content filtering or parental controls. The user device 130 may be configured to render content 120 that is found to not require filtering (e.g., blocking) by the processes of the filtering server 150 and/or the processes of the user device 130 based on the filtering criteria (e.g., taboo words) provided. The user device 130 may further be configured to block, delete, reject delivery of, and/or segregate content 120 that is deemed to require filtering based on the filtering criteria provided.

It will be appreciated that the filtering criteria may be different for different users 110. As a non-limiting example, parents of a elementary school child may wish to have stronger adult content filtering and progressively reduce the type of filtered materials as the child grows to his/her teenage years. In this case, the parents 110 may be able to set the list of taboo words, according to which content is to be filtered. Indeed, in accordance with embodiments of the disclosure, the taboo words may be set in only one language (e.g., the primary language that the parents 110 speak) and due to the semantic nature of the filtering mechanism disclosed herein, may provide filtering capability across more than one language by detecting words that have relatively similar meaning to the taboo words in the native language or other languages. As another non-limiting example, one corporation may have a policy of filtering pornography and gambling websites, but not online shopping websites. Another corporation may have a policy of filtering gambling websites and online shopping websites. These different corporations may set their taboo words and filtering algorithms and parameters according to their individual filtering needs.

In example embodiments, the user device 130 may be any suitable communications device including, but not limited to, a mobile phone, a smartphone, a tablet computing device, an electronic book (ebook) reader, wearable devices, netbook computers, notebook computers, laptop computers, desktop computers, personal digital assistants (PDA), web-enabled televisions, video game consoles, set top boxes (STB), smart appliances, cameras, navigation systems, in-vehicle infotainment systems, combinations thereof, or the like.

The user device 130 may further be configured to communicate via one or more network(s) 140 with a filtering server 150. The networks 140 may include any one or a combination of different types of suitable communications networks, such as cable networks, the Internet, wireless networks, cellular networks, and other private and/or public networks. Furthermore the networks 140 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof. It is also noted that the described techniques may apply in other client/server arrangements, as well as in non-client/server arrangements (e.g., locally stored software applications, etc.). The user device 130 may be configured to transmit and/or receive filtered content 120 and/or search results 122 on behalf of the user 110 to/from the filtering server 150 for the purpose of filtering and/or search.

The filtering server 150 may be configured to receive a document that may be checked for filtering, such as from an email server or any other suitable source. Alternatively, the filtering server 150 may receive documents or files from the user device 130 that are to be filtered. For example, the filtering server 150 may be configured to scan and filter content 120 stored on a storage device (e.g., hard disk drive) of the user device 130. The filtering server 150, regardless of the source of the content, may be configured to filter the content 120 and provide the content to the user device 130 if the content is not to be blocked and, alternatively, may sequester the content if it is to be blocked per taboo words that may be provided as filtering criteria. In example embodiments, the filtering server 150 may be configured to provide an indication of whether a document is to be filtered or not.

The filtering server 150 may further be configured to receive one or more search terms to perform a search (e.g., a semantic search) based at least in part on the search terms. In this way, the filtering server 150 may perform as, and/or interact with a search engine server, to provide search services. The search, as performed by the filtering server 150, may be across multiple languages. The search may be based, at least in part on the distance between the semantic vectors of the search terms and the semantic vectors of the words of documents among which the search is performed. As a result, the filtering server 150 may provide a relatively rich search, where the search may incorporate semantic vector spaces occupied by synonyms or near-synonyms of the search terms, as well as translations into other language(s) and/or near translation(s) to other languages. For example, if the word "maison" in French is entered, the semantic search may trigger (e.g., indicate search relevance) on proximal words like "house," (e.g., translation in English), "casa" (e.g., translation in Spanish), as well as "residence" and/or "shelter" (e.g., near translations in English).

The filtering server 150 may be configured to determine semantic vector representation of words (e.g., words of a document, key words, etc.) in any one or more of semantic vector space of various languages. The filtering server 150 may further be configured to use a translation matrix to transform a semantic vector of a word in one semantic vector space to a semantic vector in a different semantic vector space. The filtering server 150 may still further be configured to perform a transform of the semantic vector via multiple pathways (e.g., via one or more intermediary language semantic vector space(s)), depending on what translation matrices are available. In accordance with example embodiments of the disclosure, the filtering server 150 may be configured to determine hyper-volumetric distances between base language semantic vector representations of words of a document and base language semantic vector representations of key words. The distances may be determined by any suitable mechanism and/or algorithm, including, but not limited to, cosine distance, sine distance, Euclidean distance, average of distances in along each unit vector, sum of squares of distance, sum of absolute value of distance, combinations thereof, or the like.

The filtering server 150 may still further be configured to train and deploy a filtering model that uses key words (e.g., taboo words, search terms, etc.) for the purposes of filtering documents based on semantic proximity of words of the document to the key words. Once the filtering model is deployed, the filtering server 150 may be configured to apply distance data (e.g., semantic vector distance between document words and key words) for one or more documents to the filtering model to determine if the document for which the distance data is applied to the filtering model is to be filtered and/or is a search hit.

Figure 2:
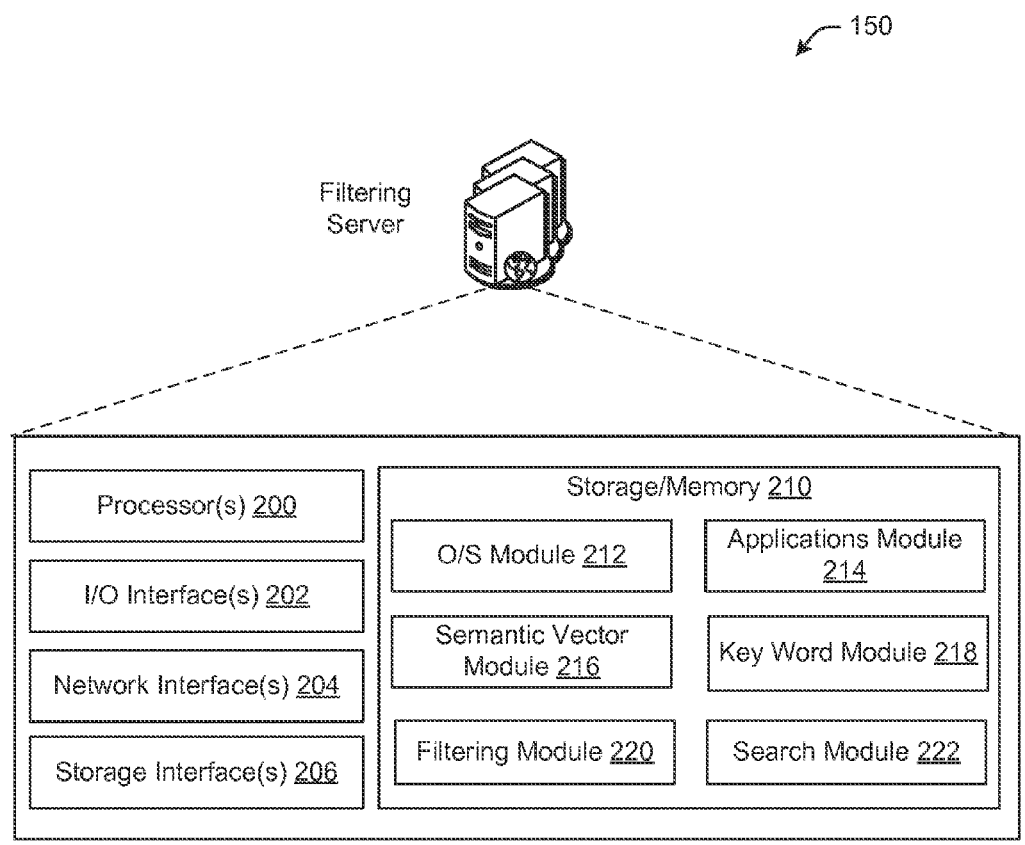
FIG. 2 depicts a simplified block diagram illustrating an example filtering server of FIG. 1, in accordance with example embodiments of the disclosure.

FIG. 2 depicts a simplified block diagram illustrating an example filtering server 150 of FIG. 1, in accordance with example embodiments of the disclosure. The filtering server 150 may include one or more processor(s) 200, one or more I/O interface(s) 202, one or more network interface(s) 204, one or more storage interface(s) 206, and one or more memory or storage 210.

The processors 200 of the filtering server 150 may be implemented as appropriate in hardware, software, firmware, or combinations thereof. Software or firmware implementations of the processors 200 may include computer-executable or machine-executable instructions written in any suitable programming language to perform the various functions described. Hardware implementations of the processors 200 may be configured to execute computer-executable or machine-executable instructions to perform the various functions described. The one or more processors 200 may include, without limitation, a central processing unit (CPU), a digital signal processor(s) (DSP), a reduced instruction set computer (RISC), a complex instruction set computer (CISC), a microprocessor, a microcontroller, a field programmable gate array (FPGA), or any combination thereof. The filtering server 150 may also include a chipset (not shown) for controlling communications between one or more processors 200 and one or more of the other components of the filtering server 150. The processors 200 may also include one or more application specific integrated circuits (ASICs) or application specific standard products (ASSPs) for handling specific data processing functions or tasks. In certain embodiments, the filtering server 150 may be based on an Intel® Architecture system and the one or more processors 200 and chipset may be from a family of Intel® processors and chipsets, such as the Intel® Atom® processor(s) family or Intel-64 processors (e.g., Sandy Bridge®, Ivy Bridge®, Haswell®, Braodwell®, Skylake®, etc.).

The one or more I/O interfaces 202 may enable the use of one or more (I/O) device(s) or user interface(s), such as a keyboard and/or mouse. The network interface(s) 204 may enable the filtering server 150 to interface with and communicate via the network(s) 140 or other communicative links. The storage interface(s) 206 may enable the filtering server 150 to store information, such as word or phrase mapping information, seed word data sets, semantic vector representations of various words in various language vector spaces, various translation matrices, various filtering and/or search models, or the like. Such data and/or information may be stored and accessed, via the storage interface(s) 206, in storage devices and/or memory 210.

The memory 210 may include one or more volatile and/or non-volatile memory devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAMBUS DRAM (RDRAM), flash memory devices, electrically erasable programmable read only memory (EEPROM), non-volatile RAM (NVRAM), universal serial bus (USB) removable memory, or combinations thereof.

The memory 210 may store program instructions that are loadable and executable on the processor(s) 200, as well as data generated or received during the execution of these programs. Turning to the contents of the memory 210 in more detail, the memory 210 may include one or more operating systems (O/S) 212, an applications module 214, a semantic vector module 216, a key word module 218, a filtering module 220, and a search module 222. Each of the modules and/or software may provide functionality for the filtering server 150, when executed by the processors 200. The modules and/or the software may or may not correspond to physical locations and/or addresses in memory 210. In other words, the contents of each of the modules 212, 214, 216, 218, 220, 222 may not be segregated from each other and may, in fact be stored in at least partially interleaved positions on the memory 210.

The O/S module 212 may have one or more operating systems stored thereon. The processors 200 may be configured to access and execute one or more operating systems stored in the (O/S) module 212 to operate the system functions of the electronic device. System functions, as managed by the operating system may include memory management, processor(s) resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 214 may contain instructions and/or applications thereon that may be executed by the processors 200 to provide one or more functionality associated with the filtering server 150. These instructions and/or applications may, in certain aspects, interact with the (O/S) module 212 and/or other modules of the filtering server 150. The applications module 214 may have instructions, software, and/or code stored thereon that may be launched and/or executed by the processors 200 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof.

The semantic vector module 216 may have instructions stored thereon that, when executed by the processors 200, enable the filtering server 150 to provide a variety functionality associated with determining a semantic vector of words in any variety of semantic vector spaces. In some example embodiments, the processor(s) 200 may be configured to identify the semantic vector of a word in a document in its native language. In some cases, the processor(s) 200 may be configured to identify the word from a document, such as the document 120 to be subject to the filtering process. In some example embodiments, the processor(s) 200 or other entities may have previously determined the semantic vector of the word, such as in the native language semantic vector space (e.g., as a corpus of words for which semantic vectors were determined) and stored that result in a datastore. In these embodiments, the processor(s) 200 may be configured to retrieve the semantic vector of the word to be translated from the datastore where it is stored. In other cases, the word to be translated may not be part of an initial corpus of words for which a semantic vector had been determined. In these embodiments, the processor(s) 200 may be configured to determine the semantic vector of the word in in its own language semantic vector space using any variety of suitable algorithms (e.g., Word2Vec tool, bag-of-words algorithm, continuous skip-gram, latent semantic analysis (LSA), latent dirichlet allocation (LDA), etc.). The processor(s) 200 may be configured to train on an initial corpus of words with defined semantic vectors and then use that training to determine the semantic vectors of other words. In example embodiments, the processor(s) 200 may be configured to perform neural network learning techniques to set up the models using an initial corpus of words that can later be used to determine the semantic vectors of other words.

The processor(s) 200, by executing instructions stored in the semantic vector module 216, may further be configured to transform semantic vectors in one linguistic semantic vector space to semantic vectors in other linguistic semantic vector space(s). The processor(s) 200 may be configured to obtain and/or determine translation matrices between various language pairs. These translation matrices may be received from any variety of sources. Alternatively, the processor(s) 200 may be configured to use any suitable algorithms to determine a translation matrix between any two languages. The processor(s) 200 may be configured to use known mappings between words (e.g., seed words) in two languages to determine the translation matrix therebetween, such as by fitting the translation matrix considering errors produced in the transformation of semantic vectors of the seed words. Once the translation matrices are known for the linguistic pairs that may be in the pathway for determining word mappings, the processor(s) 200 may be configured to use those matrices to determine semantic vectors of words in other linguistic semantic vector spaces. Therefore, with the appropriate translation matrices, the processor(s) 200 may be configured to provide semantic vectors in a native language of both words or phrases of a document, as well as key words (e.g., taboo words, search terms, etc.), and then translate those native language semantic vectors into a base language semantic vector space, if the native language is different from the base language.

The key word module 218 may have instructions stored thereon that, when executed by the processor(s) 200, enable the filtering server 150 to provide a variety of functionality associated with identifying key words for the purposes of filtering and/or search. In example embodiments, the processor(s) 200 may be configured to receive the key words, such as search terms, for the search from the user 110 via his/her user device 130, such as when the user 110 enters Internet search terms into an Internet-based search engine. In further example embodiments, the processor(s) 200 may be configured to receive the key words, such as taboo words, for document filtering on behalf of the user 110, such as from a corporate Information Technology (IT) department that sets up and/or administers content filtering policies of the corporation. In still further example embodiments, the filtering server may be configured to receive the key words, such as taboo words, from a user 110, such as a parent, via his/her user device 130, such that the key words correspond to content that the parent wishes to block his/her child from accessing. Indeed, the processor(s) 200 may be configured to receive the key words via any suitable mechanism, in accordance with example embodiments of the disclosure.

The processor(s) 200, by executing instructions stored in the key word module 218, may further be configured to generate base language semantic vectors of the key words. The base language may be a language that is selected, such that the semantic vector space of that language may be used for the purposes of semantic comparisons between words of a document and the key words, as received by the processor(s) 200. In other words, the base language and the corresponding base language semantic vector space may provide a common semantic vector space (e.g., multi-dimensional coordinate space) for semantic comparisons, such as by finding semantic vector distances within the same base language vector space between two or more words represented in the base language semantic vector space. In some example embodiments, the processor(s) 200 may receive the key words in the base language. In these example embodiments, the processor(s) 200 may be configured to perform a direct determination of the base language semantic vectors of the key words. In other example embodiments, the key words may be received by the processor(s) 200 in a native language other than the base language. In these embodiments, the processor(s) 200 may be configured to determine key word native language semantic vectors in the native language semantic vector space corresponding to the native language in which the key words were received. Once the native language semantic vectors are determined, the processor(s) 200 may further be configured to translate the native language semantic vectors to base language semantic vectors corresponding to the key words. The processor(s) 200, therefore, may be configured to identify an suitable native language-to-base language translation matrix for the native language in which the key word is provided. The processor(s) 200 may still further be configured to multiply the key word native language semantic vector by the native language-to-base language translation matrix to determine the key word base language semantic vector corresponding to the key word. In some example embodiments, the key words may be provided in more than one language. In these embodiments, the processor(s) 200 may be configured to determine the base language semantic vectors for each of the multilingual key words using the aforementioned processes. For these embodiments, the native language semantic vectors for each of the key words may be determined in its own language semantic vector space and then transformed to the base language semantic vector space using a corresponding native language-to-base language translation matrix.

The filtering module 220 may have instructions stored thereon that, when executed by the processor(s) 200, enable the filtering server 150 to provide a variety of functionality in determining if a document is to be blocked based on its content. The processor(s) 200 may be configured to determine the base language semantic vectors for all or a subset of the words of a document (e.g., email, text document, etc.) that is to be subject to filtering. This process may be similar to the one discussed for determining the key word base language semantic vectors. In some cases, the words of the document may be in the base language. In these cases, the processor(s) 200 may be configured to determine the base language semantic vectors of the words directly. In other cases, the document and the words therein may be in a language other than the base language and the processor(s) 200 may be configured to first determine the native language semantic vectors of the words and then transform those native language semantic vectors to corresponding base language semantic vectors.

The processor(s) 200, further by executing instructions stored in the filtering module 220, may be configured to determine the distances (e.g., in a hyper-volumetric sense) between the key word base language semantic vectors and the document words base language semantic vectors. The processor(s) 200 may be configured to employ any suitable mechanism to determine a distance between to semantic vectors including, but is not limited to, cosine distance, sine distance, angular distance, Euclidean distance, combinations thereof, or the like. The processor(s) 200 may further be configured to store the distance data, such as in a tabular form or as a data array in the storage/memory 210. The distance data may include any type(s) of distance measurements corresponding to each of the key words to each of the words of the document. As a non-limiting example, both cosine distance and a straight normalized vector dot product may be determined for each key word relative to each word of the document.

The processor(s) 200 may still further be configured to apply the distance data for the document to a filtering model. The filtering model may be able to determine whether the document should be blocked based on the semantic content associated therewith. The filtering model may be stored in any suitable location, such as the storage/memory 210 of the filtering server 150. If the document is to be blocked, then the processor(s) 200 may be configured to indicate the same, block the document, sequester the document, delete the document, place the document in a spam folder, provide an indication of the document to an IT department or other authority, combinations thereof, of the like. The filtering model may be any suitable type of model. In example embodiments, the filtering model may be a machine learning model and may be trained prior to deployment. The processor(s) 200 may be configured to train the filtering model using a set of training documents where it is known, such as by human processes or traditional syntactic filtering processes, if each of the documents are to be blocked.

The search module 222 may have instructions stored thereon that, when executed by the processor(s) 200, enable the filtering server 150 to provide a variety of functionality pertaining to searching documents for relevance to the search terms. In example embodiments, the search may not be just syntactic in nature, but also encompass semantic qualities of the search terms. The processor(s) 200 may be configured to determine the base language semantic vectors for all or a subset of the words of documents (e.g., web sites, text document, etc.) among which the search is to be conducted. This process may be similar to the one discussed for determining the key word base language semantic vectors and/or for the words of the document to be filtered. In some cases, the words of the documents may be in the base language. In these cases, the processor(s) 200 may be configured to determine the base language semantic vectors of the words directly. In other cases, the documents and the words therein may be in a language other than the base language and the processor(s) 200 may be configured to first determine the native language semantic vectors of the words and then transform those native language semantic vectors to corresponding base language semantic vectors.

The processor(s) 200, further by executing instructions stored in the search module 222, may be configured to determine the distances (e.g., in a hyper-volumetric sense) between the key word base language semantic vectors and the word base language semantic vectors for each of the documents. The processor(s) 200 may be configured to employ any suitable mechanism to determine a distance between to semantic vectors including, but is not limited to, cosine distance, sine distance, angular distance, Euclidean distance, combinations thereof, or the like. The processor(s) 200 may further be configured to store the distance data for each of the documents, such as in a tabular form or as a data array in the storage/memory 210. The distance data for each of the documents from among which to search may include any type(s) of distance measurements corresponding to each of the key words to each of the words of the document. As a non-limiting example, both Euclidean distance and a cosine similarity may be determined for each key word relative to each word for each of the documents.

The processor(s) 200 may still further be configured to apply the distance data sets corresponding to each of the documents to a filtering model. The filtering model may be able to determine whether the document is a search hit (e.g., sufficiently relevant to the search terms to present to the user 110 requesting the search). The filtering model may be stored in any suitable location, such as the storage/memory 210 of the filtering server 150. In further example embodiments, the processor(s) 200 may be configured to rank the relevance of documents that were semantically considered during the search process. In these example embodiments, the processor(s) 200 may be configured to generate a relevance score or any other suitable metric indicative of the relevance of a particular document. These relevance scores, in example embodiments, may be generated by the processor(s) 200 using the filtering model, such as by performing one or more mathematical operations on the distances calculated for a document to aggregate that distance data to a reduced set of metric(s) (e.g., a single relevance score) that is indicative of the relevance of the document to the search terms. The filtering model may be any suitable type of model. In example embodiments, the filtering model may be a machine learning model and may be trained prior to deployment. The processor(s) 200 may be configured to train the filtering model using a set of training documents where it is known, such as by human processes or traditional syntactic filtering processes, whether the document is relevant and/or the level of relevance of the document.

It will be appreciated that there may be overlap in the functionality of the instructions stored in the operating systems (O/S) module 212, the applications module 214, the semantic vector module 216, the key word module 218, the filtering module 220, and the search module 222. In fact, the functions of the aforementioned modules 212, 214, 216, 218, 220, 222 may interact and cooperate seamlessly under the framework of the filtering server 150. Indeed, each of the functions described for any of the modules 212, 214, 216, 218, 220, 222 may be stored in any module 212, 214, 216, 218, 220, 222 in accordance with certain embodiments of the disclosure. Further, in certain embodiments, there may be one single module that includes the instructions, programs, and/or applications described within the operating systems (O/S) module 212, the applications module 214, the semantic vector module 216, the key word module 218, the filtering module 220, and the search module 222.

Figure 3:
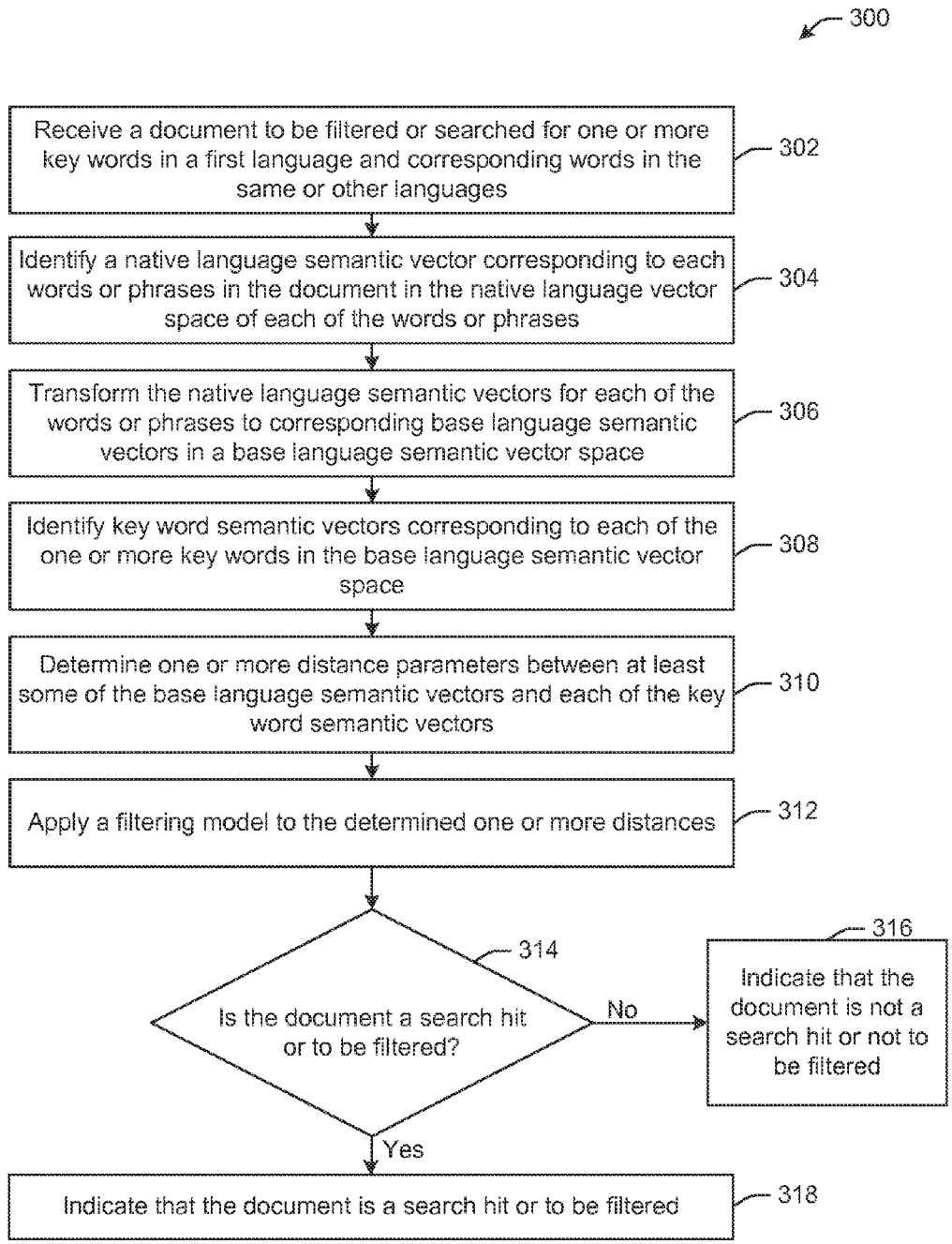
FIG. 3 depicts a flow diagram illustrating an example method for determining if a document is a search hit or is to be filtered, in accordance with example embodiments of the disclosure.

FIG. 3 depicts a flow diagram illustrating an example method 300 for determining if a document 120, 160 is a search hit or is to be filtered, in accordance with example embodiments of the disclosure. The method 300 may be performed by the filtering server 150 and the processor(s) 200 thereon in cooperation with one or more other entities of the environment 100. In alternative embodiments, the user device 130 may perform one, some or all of the processes of method 300, in accordance with example embodiments of the disclosure.

At block 302, a document to be filtered or searched for one or more key words in a first language and corresponding words in the same or other language may be received. In other words, the document may be in the same language, in some cases, as the taboo words of a filtering function or the search terms of a search function. In other cases, one or more words of the document may be in a language different from the language of the taboo words and/or search terms. The document may be part of a universe of documents from which a search is conducted or the document may be a document that is to be blocked from a user 110 based at least in part on the content of the document.

At block 304, a native language semantic vector corresponding to each of the words or phrases of the in the document may be identified in the native language vector space of each of the words or phrases. These native language semantic vectors of the words of the document may be determined by finding the semantic vector in a datastore (e.g., a look-up table). Alternatively, the native language semantic vectors of the words in the document may be derived using models that may have been trained on an initial corpus of words mapped to their semantic representation.

At block 306, the native language semantic vectors for each of the words or phrases may be transformed to corresponding base language semantic vectors in a base language semantic vector space. A translation matrix between a semantic vector space of the native language and a semantic vector space of the base language may be identified. As described above, this translation matrix may be determined based at least in part on a set of seed words that have been mapped between the target language and the base language. The translation matrix (e.g., native language-to-base language translation matrix) may be used to determine the vector representation of the words or phrases in the base language vector space. In some cases, where the words of the document are already in the base language, the processes of block 306 may not be performed, since the native language semantic vectors may already be the base language semantic vectors. In other cases, the document, as identified by the processes of block 302, may be multilingual in nature and may have words in more than one language. In this case, native language semantic vectors may be in the semantic vector space of more than one language and native language-to-base language matrices corresponding to each of the languages represented in the document may be needed for the purposes of identifying the base language semantic vectors for all of the words.

At block 308, key word semantic vectors corresponding to each of the one or more key words in the base language semantic vector space may be identified. These key words, in example embodiments, may be taboo words, as specified to filter content related (e.g., syntactically and semantically) to the taboo words. In other cases, the key words may be search terms, such as search terms specified by the user 110 for conducting a search to identify one or more documents that are syntactically and/or semantically related to the search terms.

At block 310, one or more distance parameters between at least some of the base language semantic vectors and each of the key word semantic vectors may be determined. These distance parameters may be calculated by any suitable mechanism, such as cosine distance, sine distance, cosine similarity, Euclidean distance, straight dimensional differences, combinations thereof, or the like. The one or more distance parameters may be tabulated, in some example embodiments. Furthermore, in some embodiments, the distance parameter data may be stored, such as in the storage/memory 210.

At block 312, a filtering model may be applied to the one or more determined distances. This filtering model, in the case of filtering, may be one that is trained to detect if a document is to be filtered based at least in part on its semantic content and the semantic proximity thereof to the one or more key words (e.g., taboo words). The filtering model, in the case of search, may be one that is trained to detect if a document is sufficiently relevant, from a semantic standpoint, to specified key words (e.g., search terms), to present to the user requesting the search process. The processes of training the filtering model is described in more detail below in conjunction with FIG. 5.

At block 314, it may be determined if the document is a search hit or is to be filtered. This determination may be based at least in part on the output (e.g., indication) of the filtering model to which the distance data of the document have been applied, such as in the processes of block 312. If at block 314 it is determined that the document is neither a search hit nor to be filtered, then at block 316, it may be indicated that the document is not to be filtered and/or is not a search hit. If at block 314 it is determined that the document is a search hit or is to be filtered, then at block 318, it may be indicated that the document is a search hit or is to be filtered.

In some example embodiments, the method 300 may optionally block access to a document that is deemed to be filtered. In some other example embodiments, the method 300 may optionally deliver documents that may be deemed relevant to a requested search. In some further example embodiments, the search results may be presented in a ranked order according to relevance of the results. The process of ranking relevance between two different search hits is described in greater detail below in conjunction with FIG. 7. It will still further be appreciated that in some example embodiments, the processes of the method 300 may be combined with one or more processes of traditional search mechanisms, such as syntactic search, to provide relatively robust filtering and search.

It should be noted, that the method 300 may be modified in various ways in accordance with certain embodiments of the disclosure. For example, one or more operations of method 300 may be eliminated or executed out of order in other embodiments of the disclosure. Additionally, other operations may be added to method 300 in accordance with other embodiments of the disclosure.

Figure 4:
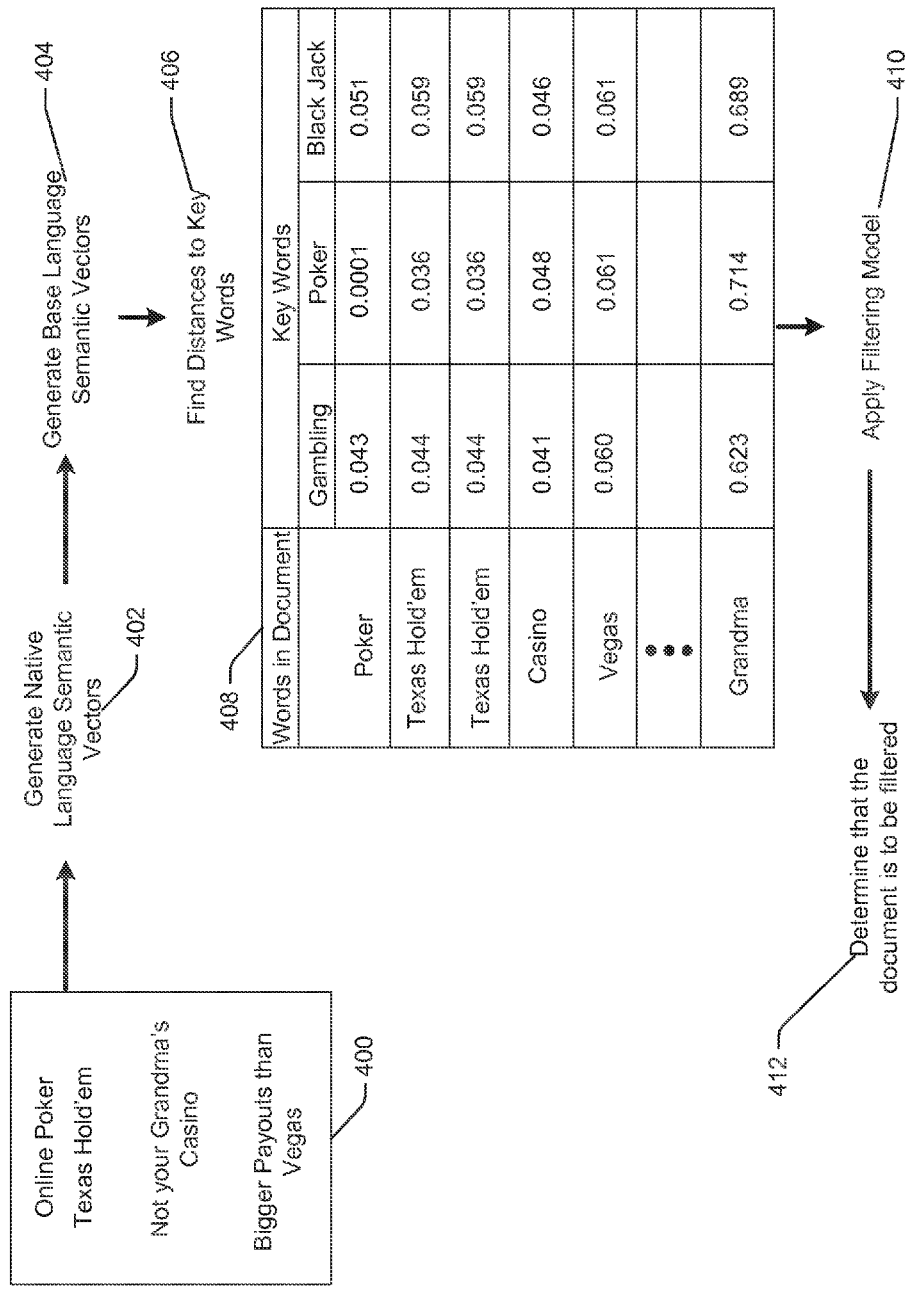
FIG. 4 depicts a schematic diagram illustrating identifying a distance parameter table and applying the distance parameter table to a filtering model for a document to be filtered, in accordance with example embodiments of the disclosure.

FIG. 4 depicts a schematic diagram illustrating identifying a distance parameter table 408 and applying the distance parameter table 408 to a filtering model 410 for a document 400 to be filtered, in accordance with example embodiments of the disclosure. The document 400, as shown, may be any suitable document, such as, for example an email received by a user 110. The document 400 has been shown as written in English for illustrative purposes, but it will be appreciated that it may indeed be written in any written language.

At 402, native language semantic vectors may be determined for each of the words of the document 400. In some example embodiments, rather than determining semantic vectors for each and every word, some words may be excluded. For example, the words "not" or "than" in the document 400 may be excluded, since these words may not add a sufficient amount of semantic differentiation from one document to another when assessing the documents for semantic quality relative to taboo words. At 404, the native language semantic vectors may be transformed to base language semantic vectors. As stated above, if the native language is indeed the base language, then the processes of 404 may not be executed, since the native language semantic vectors would be the base language semantic vectors. At 406, the distance between the base language semantic vectors and the key word semantic vectors may be calculated and then tabulated 408. As shown, although only a small set of key words are provided, due to executing a semantic search, there may be semantic proximity between the key words and some of the words of the document, despite those words not being specified as key words (e.g., taboo words). For example, only the word "poker" in the document is a word that is specified as a key word. However, relative semantic proximity of words such as "Texas Hold'em," "Casino," or "Vegas" to the specified key words may be such that a filtering model may find those words sufficiently relevant and cause for triggering an indication for filtering. It will be noted that the semantic distance "Texas Hold'em," "Casino," or "Vegas," as quantified by the distance to the key words is significantly closer than for the word "Grandma." When this distance data is provided to a suitably trained filtering model at 410, the filtering process may deem that the document is to be filtered at 412.

It will be appreciated that in the example of FIG. 4, a relatively reduced set of key words may be specified to perform a relatively robust filtering process on a wide variety of documents. Furthermore, the key words may be specified in any suitable language (e.g., any language for which the key word semantic vectors may be found in the base language semantic vector space). Further still, it should be noted that the document 400 may be in any suitable language (e.g., any language for which the semantic vectors may be found in the base language semantic vector space).

Figure 5:
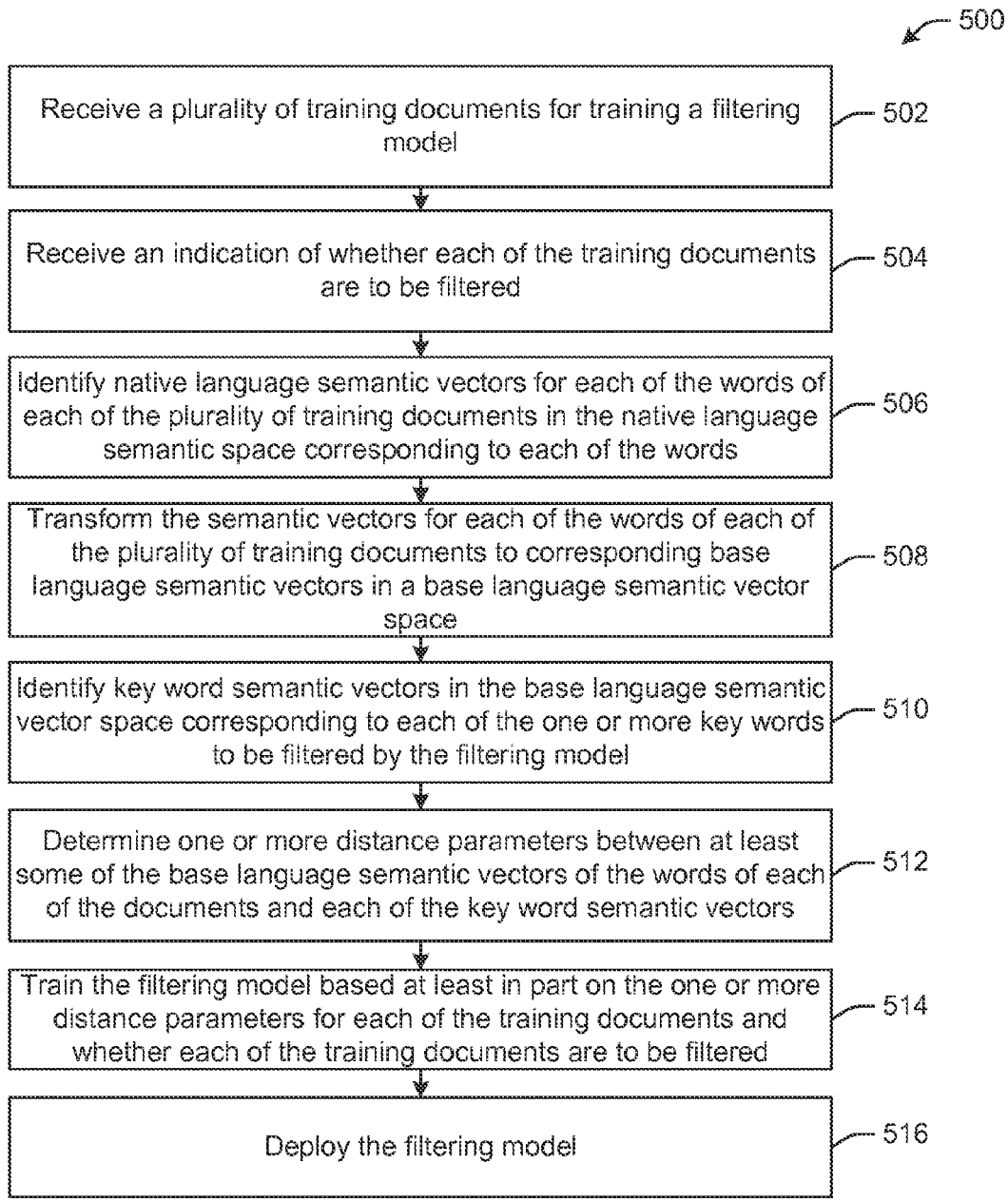
FIG. 5 depicts a flow diagram illustrating an example method for training and deploying filtering model, in accordance with example embodiments of the disclosure.

FIG. 5 depicts a flow diagram illustrating an example method 500 for training and deploying filtering model, in accordance with example embodiments of the disclosure. The method 500 may be performed by the filtering server 150 in cooperation with one or more other entities of the environment 100. In alternative embodiments, the user device 130 may perform one, some or all of the processes of method 500, in accordance with example embodiments of the disclosure.

At block 502, a plurality of training documents for training a filtering model may be received. These training documents may have been pre-analyzed to determine if they are relevant and should trigger a filtering determination. In some cases, the pre-analysis may be performed by a human. In other cases, the pre-analysis may be performed by a machine (e.g., a computing machine suitable for filtering) using traditional filtering mechanisms, such as a syntactic filtering. At block 504, an indication of whether each of the training documents are to be filtered may be received. These may be received in table form, for example, indicating an identifier associated with the training document. In other cases, this information may be appended or prepended, such as in the form of metadata, to the training documents themselves.

At block 506, native language semantic vectors may be identified for each of the words of each of the plurality of training documents in the native language semantic vector space corresponding to each of the words. Optionally, native language semantic vectors may be identified for only a subset of the words. In example embodiments, words that are unlikely to provide a relatively high level of semantic differentiation between documents may be excluded. As a non-limiting example, short words (e.g., less than four letters) may be excluded. As another non-limiting example, common words may be excluded, such as, for example, "an," "the," "of," or the like. In some example embodiments, there may be a list of words that are to be excluded, such that native language semantic vectors are not determined for those words.

At block 508, the semantic vectors for each of the words of each of the plurality of training documents may be transformed to corresponding base language semantic vectors in a base language semantic vector space. As discussed above, this process may involve identifying suitable native language-to-base language translation matrices. For example, if a document contains Gujarati words and Marathi words and the base language is Hindi, then both a Gujarati-to-Hindi translation matrix and a Marathi-to-Hindi translation matrix would be needed to transform the native language semantic vectors in Gujarati semantic vector space and the native language semantic vectors in the Marathi semantic vector space to base language semantic vectors in Hindi semantic vector space.

At block 510, key word semantic vectors in the base language semantic vector space corresponding to each of the one or more key words to be filtered by the filtering model may be identified. As discussed above, this may be direct process or an indirect process depending on whether the key words have been specified in the base language or in a native language other than the base language. At block 512, one or more distance parameters between at least some of the base language semantic vectors of the words of each of the documents and each of the key word semantic vectors may be determined. These distances may be determined and/or tabulated according to any of the calculations as described above.

At block 514, the filtering model may be trained based at least in part on the one or more distance parameters for each of the training documents and whether each of the training documents are to be filtered. This may be a supervised machine learning model. In other cases, the filtering model may be unsupervised or partially supervised. The training model may be any suitable linear, affine, or non-linear model including, but not limited to regression model(s), any type of decision tree model(s), Bayesian inference model(s), any suitable type of conditional statistical models, combinations thereof, or the like. At block 516, the filtering model may be deployed. Once deployed, the filtering server 150 may be able to apply distance data, other derived distance parameters, or thresholded distance tallies to the filtering model to generate a blocking/no blocking determination and/or determination of a search hit.

It should be noted, that the method 500 may be modified in various ways in accordance with certain embodiments of the disclosure. For example, one or more operations of method 500 may be eliminated or executed out of order in other embodiments of the disclosure. Additionally, other operations may be added to method 500 in accordance with other embodiments of the disclosure.

Figure 6:
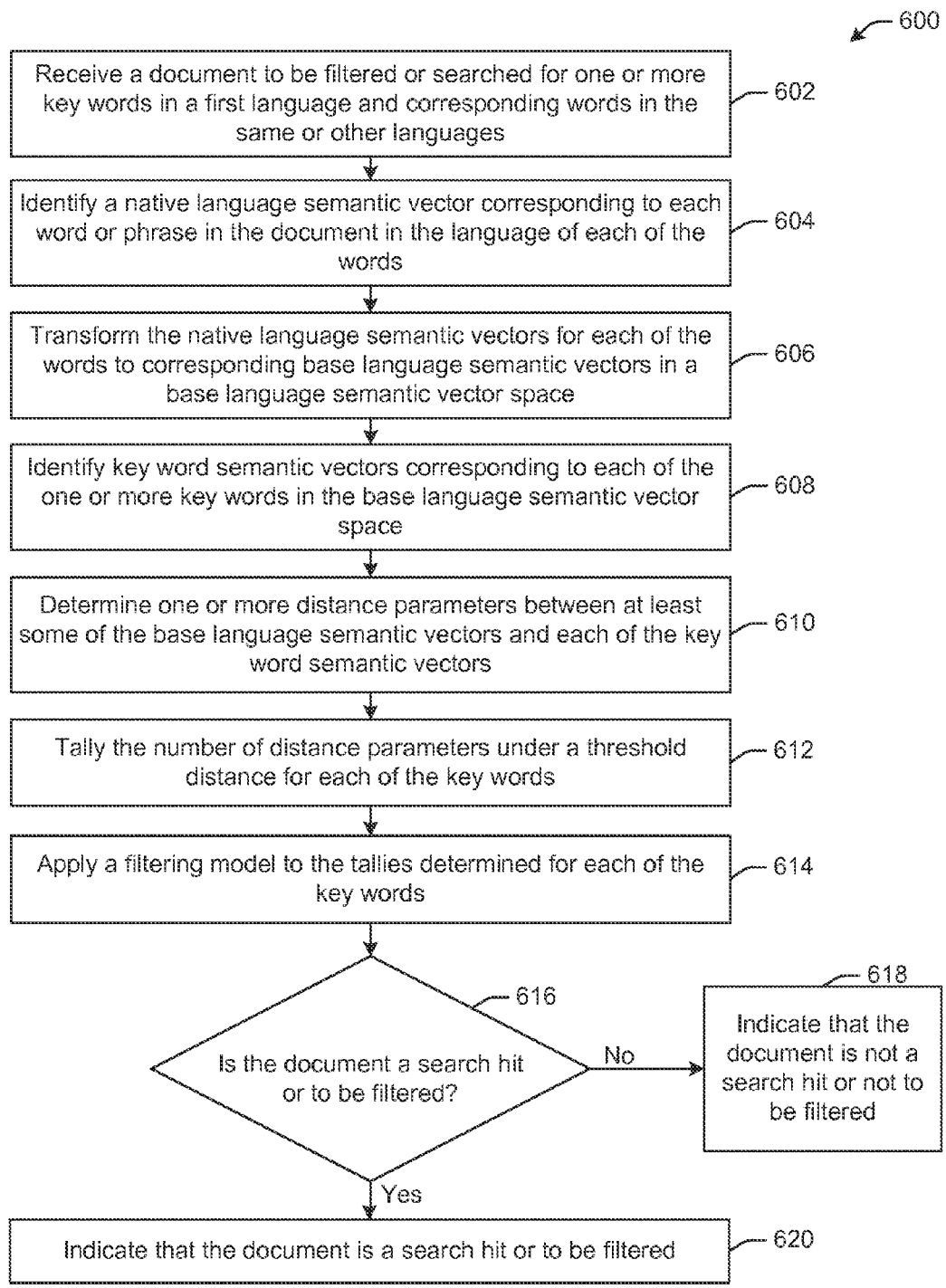
FIG. 6 depicts a flow diagram illustrating an example method for determining if a document is a search hit or is to be filtered by generating a key word tally by semantic vector comparison, in accordance with example embodiments of the disclosure.

FIG. 6 depicts a flow diagram illustrating an example method 600 for determining if a document is a search hit or is to be filtered by generating a key word tally by semantic vector comparison, in accordance with example embodiments of the disclosure. The method 600 may be performed by the filtering server 150 in cooperation with one or more other entities of the environment 100. In alternative embodiments, the user device 130 may perform one, some or all of the processes of method 600, in accordance with example embodiments of the disclosure.

At block 602, a document to be filtered or searched for one or more key words in a first language and corresponding words in the same or other language may be received. In other words, the document may be in the same language, in some cases, as the taboo words of a filtering function or the search terms of a search function. In other cases, one or more words of the document may be in a language different from the language of the taboo words and/or search terms. At block 604, a native language semantic vector corresponding to each of the words or phrases of the in the document may be identified in the native language vector space of each of the words or phrases. At block 606, the native language semantic vectors for each of the words or phrases may be transformed to corresponding base language semantic vectors in a base language semantic vector space. This process may be optional in some cases and may not be performed if the native language semantic vectors are already in the base language semantic vector space (e.g., if the native language is the base language). At block 608, key word semantic vectors corresponding to each of the one or more key words in the base language semantic vector space may be identified. At block 610, one or more distance parameters between at least some of the base language semantic vectors and each of the key word semantic vectors may be determined.

At block 612, the number of distance parameters under a threshold distance for each of the key words may be tallied. For example, the tallies may indicate the number of words of the document that are in relatively close (e.g., within the threshold distance) proximity of one or more key words. Thus a data set may be generated with an integer (e.g., the tally) corresponding to each of the key words, indicating the number of words within a threshold distance of that key word. In example embodiments, for a word to trigger the threshold condition associated with a particular key word, the word does not necessarily have to be the same word as the key word. Indeed, the word may be relatively semantically close (e.g., have relatively similar meaning) to trigger an increment in the tally count. As a non-limiting example, a cosine distance of 0.050 (in normalized range of 0 to 1) may trigger a threshold condition (e.g., the threshold is 0.050).

At block 614, a filtering model may be applied to the tallies determined for each of the key words. In this case, the filtering model may have been trained on a tally data set, rather than the raw distance data or other derived parameters calculated form the distance data. At block 616, it may be determined if the document is a search hit or is to be filtered. This determination may be based at least in part on the determined tallies corresponding to each of the key words as determined by the processes of block 612. If at block 616 it is determined that the document is neither a search hit nor to be filtered, then at block 618, it may be indicated that the document is not to be filtered and/or is not a search hit. If at block 616 it is determined that the document is a search hit or is to be filtered, then at block 620, it may be indicated that the document is a search hit or is to be filtered.

It should be noted, that the method 600 may be modified in various ways in accordance with certain embodiments of the disclosure. For example, one or more operations of method 600 may be eliminated or executed out of order in other embodiments of the disclosure. Additionally, other operations may be added to method 600 in accordance with other embodiments of the disclosure.

Figure 7:
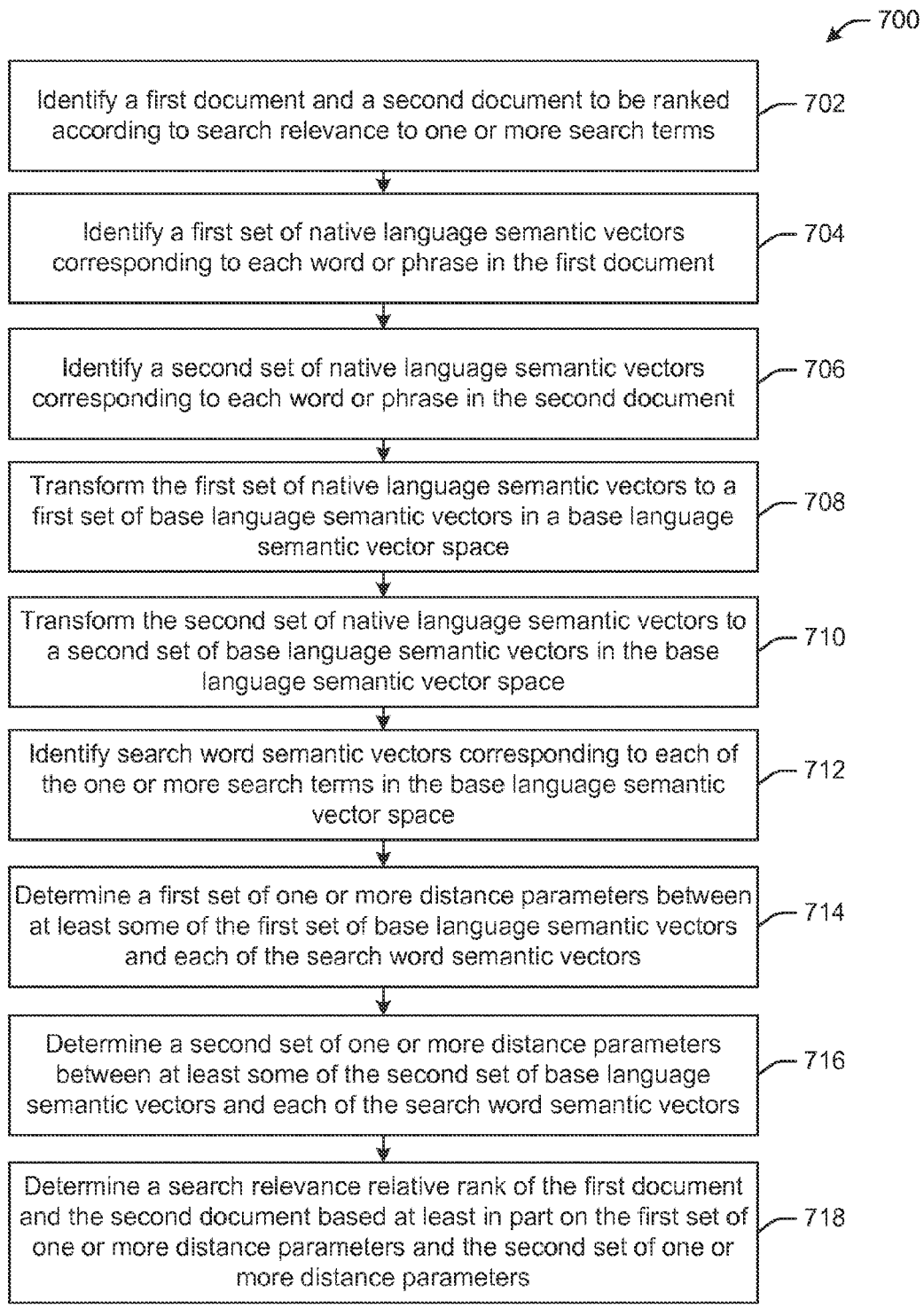
FIG. 7 depicts a flow diagram illustrating an example method for ranking search results based at least in part on one or more distance parameters associated with documents to be ranked, in accordance with example embodiments of the disclosure.

FIG. 7 depicts a flow diagram illustrating an example method 700 for ranking search results based at least in part on one or more distance parameters associated with documents to be ranked, in accordance with example embodiments of the disclosure. The method 700 may be performed by the filtering server 150 in cooperation with one or more other entities of the environment 100. In alternative embodiments, the user device 130 may perform one, some or all of the processes of method 700, in accordance with example embodiments of the disclosure.

At block 702, a first document and a second document to be ranked according to search relevance to one or more search terms may be identified. At block 704, a first set of native language semantic vectors corresponding to each word or phrase in the first document may be identified. At block 706, a second set of native language semantic vectors corresponding to each word or phrase in the second document may be identified. At block 708, the first set of native language semantic vectors may be transformed to a first set of base language semantic vectors in a base language semantic vector space. At block 710, the second set of native language semantic vectors may be transformed to a second set of base language semantic vectors in the base language semantic vector space. As discussed above, the processes of blocks 708 and/or 710 may not be performed in the case where the native language semantic vectors are the same as the base language semantic vectors. At block 712, search word semantic vectors corresponding to each of the one or more search terms in the base language semantic vector space may be identified. At block 714, a first set of one or more distance parameters between at least some of the first set of base language semantic vectors and each of the search word semantic vectors may be determined. At block 716, a second set of one or more distance parameters between at least some of the second set of base language semantic vectors and each of the search word semantic vectors may be determined.

At block 718, a search relevance relative rank of the first document and the second document may be determined based at least in part on the first set of one or more distance parameters and the second set of one or more distance parameters. In some example embodiments, the document that has the smallest distances may be deemed the most relevant. In other example embodiments, the distances determined for each of the documents may be normalized. For example, an average or median of the distances for the two documents may be compared. In other example embodiments, the number of words within a threshold distance of the key words may be compared. In still other example embodiments, the ratio of the number of words within a threshold of the key words to the number of words outside of the threshold may be compared for the two documents. Indeed, any suitable mechanism may be used for comparing the distances determined for the two document for the purposes of ranking In some case, a relevance score may be calculated for each of the documents being compared based at least in part on the determined distances and then used to rank two or more documents based on relevance to key words.

It should be noted, that the method 700 may be modified in various ways in accordance with certain embodiments of the disclosure. For example, one or more operations of method 700 may be eliminated or executed out of order in other embodiments of the disclosure. Additionally, other operations may be added to method 700 in accordance with other embodiments of the disclosure.

Embodiments described herein may be implemented using hardware, software, and/or firmware, for example, to perform the methods and/or operations described herein. Certain embodiments described herein may be provided as one or more tangible machine-readable media storing machine-executable instructions that, if executed by a machine, cause the machine to perform the methods and/or operations described herein. The tangible machine-readable media may include, but is not limited to, any type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware. Additionally, in certain embodiments, a special-purpose computer or a particular machine may be formed in order to identify actuated input elements and process the identifications.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In accordance with example embodiments of the disclosure, there may be one or more non-transitory computer-readable media comprising computer-executable instructions that, when executed by one or more processors, configure the one or more processors to perform operations including receiving a document; identifying a first word in the document and a second word in the document; determining a first base language semantic vector of the first word; determining a second base language semantic vector of the second word; identifying a key word; determining a key word base language semantic vector; determining a first distance between the first base language semantic vector and the key word base language semantic vector; determining a second distance between the second base language semantic vector and the key word base language semantic vector; and determining that the document is to be filtered based at least in part on the first distance and the second distance. In example embodiments the operations further comprise sequestering the document based at least in part on the determination that the document is to be filtered. In further example embodiments, determining the first base language semantic vector comprises determining a native language semantic vector corresponding to the first word; and transforming, based at least in part on a native language-to-base language translation matrix, the native language semantic vector to the first base language semantic vector. In still further example embodiments, determining the key word base language semantic vector comprises determining a key word native language semantic vector corresponding to the key word; and transforming, based at least in part on a native language-to-base language translation matrix, the key word native language semantic vector to the key word base language semantic vector.

In some example embodiments, the one or more non-transitory computer-readable media may be such that determining the first distance comprises determining at least one of: (i) a cosine distance between the first base language semantic vector and the key word base language semantic vector, or (ii) an Euclidean distance between the first base language semantic vector and the key word base language semantic vector. In further example embodiments, determining that the document is to be filtered comprises identifying a filtering model; applying the first distance and the second distance to the filtering model; and identifying, based at least in part on the applying, that the document is to be filtered. In still further example embodiments, the operations further comprise receiving a plurality of training documents; receiving an indication of the filtering status corresponding to each of the training documents; and training the filtering model based at least in part on the plurality of training documents and the indication of the filtering status corresponding to each of the training documents.

In some example embodiments in accordance with the disclosure, there may be a system. The system may include at least one memory that stores computer-executable instructions; and at least one processor configured to access the at least one memory, wherein the at least one processor is configured to execute the computer-executable instructions to receive a document comprising a plurality of words; determine a respective base language semantic vector corresponding to each of the plurality of words; identify a key word; determine a key word base language semantic vector; determine a set of distance data comprising respective distances corresponding to each of the base language semantic vectors, wherein the respective distances are between the key word base language semantic vector and each of the corresponding base language semantic vectors; apply the set of distance data to a filtering model; and determine that the document is to be filtered based at least in part on the application of the set of distance data to the filtering model. In further example embodiments, to determine the respective base language semantic vector corresponding to each of the plurality of words comprises the at least one processor is configured to execute the computer-executable instructions to determine a respective native language semantic vector corresponding to each of the plurality of words, wherein each of the plurality of words are in a native language and the respective native language semantic vectors are defined in a native language semantic vector space corresponding to a native language of the plurality of words; identifying a native language-to-base language translation matrix corresponding to the native language; and transform, based at least in art on the native language-to-base language translation matrix, each of the respective native language semantic vectors to the respective base language semantic vectors. In still further example embodiments, to identify a key word comprises the at least one processor is configured to execute the computer-executable instructions to receive the key word as a taboo word that indicates at least one of: (i) pornography; (ii) sexually explicit content; (iii) violent content; (iv) adult content; (v) gambling related content; (vi) gaming related content; or (vii) violent content.

In some example embodiments, for the system, to determine a key word base language semantic vector comprises the at least one processor is configured to identify that the key word is received in a base language corresponding to the key word base language semantic vector. In further example embodiments, the document is a first document, the plurality of words is a first plurality of words, the set of distance data is a first set of distance data, and the at least one processor is further configured to receive a second document comprising a second plurality of words; determine a second set of distance data corresponding to the second document; apply the second set of distance data to the filtering model; and determine that the second document is not to be filtered based at least in part on the application of the second set of distance data to the filtering model. Still further embodiments may include the at least one processor is further configured to receive a plurality of training documents; receive an indication of the filtering status corresponding to each of the training documents; and train the filtering model based at least in part on the plurality of training documents and the indication of the filtering status corresponding to each of the training documents. In yet further example embodiments, the key word is a first key word, the key word base language semantic vector is a first key word base language semantic vector, the set of distance data is a first set of distance data, and wherein the at least one processor is further configured to identify a second key word; determine a second key word base language semantic vector; determine a second set of distance data comprising respective distances corresponding to each of the base language semantic vectors, wherein the respective distances are between the second key word base language semantic vector and each of the corresponding base language semantic vectors; and apply the second set of distance data to the filtering model. In further embodiments, to apply the set of distance data to the filtering model comprises the at least one processor is configured to identify a threshold distance corresponding to the key word; tally the number of distances less than the threshold distance in the set of distance data; and apply the tally of the number of distances to the filtering model.

In some example embodiments of the disclosure, there may be a method. The method may include receiving, by one or more processors, a search term; identifying, by the one or more processors, a document comprising a plurality of words; determining, by the one or more processors, a respective base language semantic vector corresponding to each of the plurality of words; determining, by the one or more processors, a search term base language semantic vector corresponding to the search term; determining, by the one or more processors, a set of distance data comprising respective distances corresponding to each of the base language semantic vectors, wherein the respective distances are between the search term base language semantic vector and each of the corresponding base language semantic vectors; applying, by the one or more processors, the set of distance data to a filtering model; and determining, by the one or more processors, that the document is a search hit based at least in part on the application of the set of distance data to the filtering model. In further example embodiments, the document is a first document, the plurality of words is a second plurality of words, the set of distance data is a first set of distance data, and further comprising identifying, by the one or more processors, a second document comprising a second plurality of words; determining, by the one or more processors, a second set of distance data comprising respective distances corresponding to each of the second plurality of words; applying, by the one or more processors, the second set of distance data to the filtering model; and determining, by the one or more processors, that the second document is a search hit based at least in part on the application of the second set of distance data to the filtering model. In yet further example embodiments, applying the first set of distance data to the filtering model generates a first relevance score, and wherein applying the second set of distance data to the filtering model generates a second generates a second relevance score. In still further example embodiments, the method may include determining, by the one or more processors and based at least in part on the first relevance score and the second relevance score, that the first document is more relevant to the search term than the second document. In some example embodiments, applying the set of distance data to the filtering model further comprises identifying a threshold distance corresponding to the search term; tallying the number of distances less than the threshold distance in the set of distance data; and applying the tally of the number of distances to the filtering model.

The claimed invention is:

1. One or more non-transitory computer-readable medium comprising computer-executable instruction that, when executed by one or more processors, cause the one or more processors to at least:
in response to receiving electronic content to be delivered to a destination address, identify a first word in the electronic content and a second word in the electronic content;
determine a first base language semantic vector of the first word;
determine a second base language semantic vector of the second word;
determine, for a keyword, a key word base language semantic vector, the keyword being a taboo word;
determine a first distance between the first base language semantic vector and the key word base language semantic vector;
determine a second distance between the second base language semantic vector and the key word base language semantic vector;
determine that the first distance is less than a threshold distance;
determine that the second distance is less than the threshold distance;
determine a sum of the first distance and the second distance;
determine a score of the electronic content based at least in part on the sum, wherein the score indicates a relevance of the electronic content to the key word;
determine that the electronic content is not to be delivered to the destination address based at least in part on the score of the electronic content; and
prevent the electronic content from being delivered to the destination address.

2. The one or more non-transitory computer-readable medium of claim 1, wherein the computer-executable instructions further cause the one or more processors to sequester the electronic content, when the electronic content is not to be delivered to the destination address.

3. The one or more non-transitory computer-readable medium of claim 1, wherein the determining of the first base language semantic vector includes:
determining a native language semantic vector corresponding to the first word; and
transforming, based at least in part on a native language-to-base language translation matrix, the native language semantic vector to the first base language semantic vector.

4. The one or more non-transitory computer-readable medium of claim 1, wherein the determining of the key word base language semantic vector includes:
determining a key word native language semantic vector corresponding to the key word; and
transforming, based at least in part on a native language-to-base language translation matrix, the key word native language semantic vector to the key word base language semantic vector.

5. The one or more non-transitory computer-readable medium of claim 1, wherein the determining of the first distance includes determining at least one of: a cosine distance between the first base language semantic vector and the key word base language semantic vector, or an Euclidean distance between the first base language semantic vector and the key word base language semantic vector.

6. The one or more non-transitory computer-readable medium of claim 1, wherein the computer-executable instructions further cause the one or more processors to:
determine a first relevance between a first training document and the key word, the first training document having a first known filtering status;
determine a second relevance between a second training document and the key word, the second training document having a second known filtering status;
determine, with a filtering model, a filtering status for a plurality of training documents based at least in part on the first relevance and the second relevance;
compare the filtering status to the first known filtering status;

compare the filtering status to the second known filtering status; and train the filtering model based at least in part on a result of the comparing of the filtering status to the first known filtering status and the comparing of the filtering status to the second known filtering status.

7. A system, comprising:

at least one memory that stores computer-executable instructions; and at least one processor to access the at least one memory, the computer-executable instructions, when executed, to cause the at least one processor to at least:

in response to receiving electronic content to be delivered to a destination address, determine a first base language semantic vector corresponding to a first word in the electronic content;

determine a second base language semantic vector corresponding to a second word in the electronic content;

determine, for a key word, a key word base language semantic vector, the key word being a taboo word;

determine a set of distance data including a first distance between the key word base language semantic vector and the first base language semantic vector, and a second distance between the key word base language semantic vector and the second base language semantic vector;

determine whether the first distance and the second distance are less than a threshold distance;

when the first and second distances are less than the threshold distance, add the first distance and the second distance to obtain a sum;

determine a score of the electronic content based at least in part on the sum, wherein the score indicates a relevance of the electronic content to the key word; and determine that the electronic content is not to be delivered to the destination address based at least in part on the score of the electronic content; and prevent the electronic content from being delivered to the destination address.

8. The system of claim 7, wherein the computer-executable instructions further cause the at least one processor to determine the first base language semantic vector by:

determining a first native language semantic vector corresponding to the first word, wherein the first word is in a native language and the first native language semantic vector is defined in a native language semantic vector space corresponding to a native language of the first word;

identifying a native language-to-base language translation matrix corresponding to the native language; and transforming, based at least in part on the native language-to-base language translation matrix, the first native language semantic vector to the first base language semantic vector.

9. The system of claim 7, wherein the key word is associated with at least one of: pornography; sexually explicit content; violent content; adult content; gambling related content; gaming related content; or violent content.

10. The system of claim 7, wherein the computer-executable instructions further cause the at least one processor to determine a key word base language semantic vector by identifying that the key word is received in a base language corresponding to the key word base language semantic vector.

11. The system of claim 7, wherein the electronic content is first electronic content, the first electronic content includes a first document, the first document includes a first plurality of words, the set of distance data is a first set of distance data, and the computer-executable instructions further cause the at least one processor to:

determine a third base language semantic vector corresponding to a third word included in a second document included in second electronic content;

determine a fourth base language semantic vector corresponding to a fourth word included in the second document;

determine a second set of distance data corresponding to the second document, wherein the second set of distance data includes a third distance between the third base language semantic vector and the key word base language semantic vector, and a fourth distance between the fourth base language semantic vector and the key word base language semantic vector;

determine that the third distance and the fourth distance are less than the threshold distance;

determine a sum of the third distance and the fourth distance;

determine a second score of the second document based at least in part on the sum; and determine that the second electronic content including the second document is to be delivered to the destination address based at least in part of the second score.

12. The system of claim 7, wherein the computer-executable instructions further cause the at least one processor to:

access a plurality of training documents including a first training document with a first known filtering status and a second training document with a second known filtering status;

determine a first relevance between the first training document and the key word;

determine a second relevance between the second training document and the key word;

determine, with a filtering model, a filtering status for the plurality of training documents based at least in part on the first relevance and the second relevance;

compare the filtering status to the first known filtering status;

compare the filtering status to the second known filtering status; and train the filtering model based at least in part on a result of the comparing of the filtering status to the first known filtering status, and of the comparing of the filtering status to the second known filtering status.

13. The system of claim 7, wherein the key word is a first key word, the key word base language semantic vector is a first key word base language semantic vector, the set of distance data is a first set of distance data, and the computer-executable instructions further cause the at least one processor to:

determine a second key word base language semantic vector based on a second key word; and determine a second set of distance data including a third distance between the first base language semantic vector and the second key word base language semantic vector, and a fourth distance between the second base language semantic vector and the second key word base language semantic vector, the determining of the score of the electronic content including determining the score based at least in part on the second set of distance data.

14. A method, comprising:
in response to receiving electronic content to be delivered to a destination address determining, by executing an instruction with the one or more processors, a first base language semantic vector corresponding to a first word in the electronic content;
determining, by executing an instruction with the one or more processors, a second base language semantic vector corresponding to a second word in the electronic content;
determining, by executing an instruction with the one or more processors, for a key word, a key word base language semantic vector, the key word being a taboo word;
determining, by executing an instruction with the one or more processors, a set of distance data including a first distance between the first base language semantic vector and the key word base language semantic vector, and a second distance between the second base language semantic vector and the key word base language semantic vector;
determining, by executing an instruction with the one or more processors, that the first distance and the second distance are less than a threshold distance;
determining, by executing an instruction with the one or more processors, a score of the electronic content based at least in part on a sum of the first and second distances, the score indicating a relevance of the electronic content to the key word;
determining, by executing in instruction with the one or more processors, that the electronic content is not to be delivered to the destination address based at least in part on the score of the electronic content; and
preventing the electronic content from being delivered to the destination address.

15. The method of claim 14, wherein the electronic content is a first electronic content, the set of distance data is a first set of distance data, and the method further includes:
identifying a second electronic content including a third word and a fourth word;
determining a second set of distance data including a third distance between the third word and the key word base language semantic vector, and a fourth distance between the fourth word and the key word base language semantic vector;
determining a second score of the second electronic content based at least in part on the second set of distance data; and
determining that the second electronic content is not to be delivered to the destination address based at least in part on the second score of the second electronic content.

* * * * *